(12) United States Patent  
Šulc

(10) Patent No.: US 8,531,265 B2
(45) Date of Patent: Sep. 10, 2013

(54) MODULE FOR WIRELESS COMMUNICATION BETWEEN ELECTRIC OR ELECTRONIC EQUIPMENT OR SYSTEMS, METHOD FOR ITS CONTROL AND METHOD FOR CREATING GENERIC PLATFORMS FOR USER APPLICATIONS IN AREA OF WIRELESS COMMUNICATIONS WITH THOSE MODULES

(75) Inventor: Vladimir Šulc, Sobotka (CZ)

(73) Assignee: Microrisc S.R.O., Jicin (CZ)

( * ) Notice: Subject to any disclaimer, the term of this patent is extended or adjusted under 35 U.S.C. 154(b) by 1050 days.

(21) Appl. No.: 11/526,819

(22) Filed: Sep. 26, 2006

(65) Prior Publication Data

US 2007/0188343 A1     Aug. 16, 2007

(30) Foreign Application Priority Data

Sep. 26, 2005   (CZ) ................. PV 2005-616

(51) Int. Cl.
*G06F 9/44*     (2006.01)
(52) U.S. Cl.
USPC ............... 340/3.3; 340/539.13; 340/539.1; 713/2
(58) Field of Classification Search
USPC ............. 340/825.22, 539.1; 455/524, 561, 455/92; 713/2
See application file for complete search history.

(56) References Cited

U.S. PATENT DOCUMENTS

| | | | | |
|---|---|---|---|---|
| 4,368,468 A * | 1/1983 | Lisle et al. | .................... | 342/151 |
| H610 H * | 3/1989 | Focarile et al. | .............. | 340/7.42 |
| 4,910,510 A * | 3/1990 | Davis et al. | ................... | 340/7.41 |
| 4,942,534 A * | 7/1990 | Yokoyama et al. | ............... | 700/9 |
| 5,173,706 A * | 12/1992 | Urkowitz | ........................ | 342/99 |
| 5,248,967 A * | 9/1993 | Daneshfar | ..................... | 340/931 |
| 5,426,424 A * | 6/1995 | Vanden Heuvel et al. | ... | 340/7.52 |
| 5,450,492 A * | 9/1995 | Hook et al. | ..................... | 380/28 |
| 5,455,572 A * | 10/1995 | Cannon et al. | ............... | 340/7.54 |
| 5,745,049 A * | 4/1998 | Akiyama et al. | ......... | 340/870.17 |
| 5,784,633 A * | 7/1998 | Petty | .............................. | 710/60 |
| 5,826,166 A * | 10/1998 | Brooks et al. | ................. | 725/134 |
| 5,896,261 A * | 4/1999 | Black | ............................. | 361/92 |
| 6,259,991 B1 * | 7/2001 | Nysen | ......................... | 701/300 |
| 6,396,733 B1 * | 5/2002 | Lu et al. | ....................... | 365/158 |
| 6,653,824 B1 * | 11/2003 | Whitlock | ....................... | 323/344 |
| 6,675,022 B2 * | 1/2004 | Burgan et al. | ................ | 455/524 |
| 6,861,952 B1 | 3/2005 | Billmaier | | |
| 6,917,281 B1 * | 7/2005 | Goldberg | ..................... | 340/7.53 |
| 6,963,765 B2 * | 11/2005 | Hattori et al. | ................ | 455/574 |
| 6,993,417 B2 | 1/2006 | Osann, Jr. | | |
| 7,000,835 B2 * | 2/2006 | Komatsu | ...................... | 235/437 |

(Continued)

*Primary Examiner* — Jennifer Mehmood
*Assistant Examiner* — Rufus Point
(74) *Attorney, Agent, or Firm* — Buchanan Ingersoll & Rooney PC

(57) ABSTRACT

A module for wireless communication between electric or electronic equipment or systems, in high frequency bands at least in the range of 300 MHz to 2.60 GHz, particularly for home and office automation systems, comprising a block (RF) for wireless communication, connected to an antenna interface (ANT) and a power supply interface (Uin) and also to a control block (RFCON). The module further contains a control unit (MCU) comprising a central processor unit (CPU), a memory (MOS) with the operational system control code to ensure the function of wireless communication and a memory (MAP) for storing or starting up a user-defined applicational control code, where the control unit (MCU) is connected to the control block (RFCON), to the communication interface (COM) of the module and to the power supply interface (Uin).

18 Claims, 3 Drawing Sheets

(56) References Cited

U.S. PATENT DOCUMENTS

| | | |
|---|---|---|
| 7,092,772 B2 | 8/2006 | Murray et al. |
| 2002/0029303 A1* | 3/2002 | Nguyen ............... 709/327 |
| 2003/0149867 A1* | 8/2003 | Park et al. ............... 713/1 |
| 2004/0267383 A1* | 12/2004 | Bicknell et al. ......... 700/65 |
| 2005/0080496 A1* | 4/2005 | Hayes et al. ............ 700/65 |
| 2005/0164684 A1* | 7/2005 | Chen et al. ........... 455/414.1 |
| 2006/0041572 A1* | 2/2006 | Maruyama ............. 707/101 |
| 2006/0141946 A1* | 6/2006 | Rush et al. .............. 455/92 |
| 2008/0028119 A1* | 1/2008 | Randell et al. .......... 710/307 |
| 2008/0052696 A1* | 2/2008 | Pradadarao ............. 717/158 |

\* cited by examiner

TR 433-01

TR 868-01

TR 916-01

MODULE FOR WIRELESS COMMUNICATION BETWEEN ELECTRIC OR ELECTRONIC EQUIPMENT OR SYSTEMS, METHOD FOR ITS CONTROL AND METHOD FOR CREATING GENERIC PLATFORMS FOR USER APPLICATIONS IN AREA OF WIRELESS COMMUNICATIONS WITH THOSE MODULES

FIELD OF THE INVENTION

The invention as filed relates to an arrangement of a module (e.g., device) for wireless communication between electric or electronic equipment or systems, in high frequency bands in the range of 300 MHz to 2.60 GHz, for home and office automation systems, for example. The electric or electronic equipment includes controls for electronics, and can be controlled or can provide data, for example a cordless thermometer. The invention also relates to a method of controlling the module and a method of creating generic platforms for user applications in the area of wireless communications with such a module.

DESCRIPTION OF THE PRIOR ART

In the area of less expensive communications equipment and modules suitable for wireless communication in home and office automation systems, there are, at the present time, affordable, simple receiver modules and transmitter modules, but less frequently one finds transceiver modules or other specialized independent modules, such as control modules, for example. Such modules for the most part do not include a processor.

Defined standards such as WI-FI®, BLUETOOTH® and ZIGBEE®, for example, have been developed for exacting applications, for which specialized circuits or modules are created, where the higher price of such specialized circuits or modules corresponds to the complexity of these solutions and standards. Such solutions are generally presented in a so-called software stack, that is, a file of routine operations, ensuring the complete function of the application and the implementation on the appropriate hardware. The complexity and exacting requirements of these solutions on the hardware used impedes their use in less demanding systems, for example in home and office automation. There is thus a lack in the market for a self-contained conception of a generic platform for the construction of inexpensive equipment ensuring wireless connectivity which would be suitable for home and office automation, and thus for the area of less expensive systems with lower transmission speeds and with a lower volume of transmitted data, to facilitate the easy addition of inexpensive wireless connectivity by ordinary electronic and electric equipment and which would also facilitate quick and effective development of user applications.

The invention as filed in large measure eliminates this disadvantage, involving the arrangement of a module for wireless communication electrically or electronically of controlling equipment or systems, in high frequency bands in the range of 300 MHz to 2.60 GHz, which can be used for constructing low-cost modular communication platforms suitable particularly in the area of home and office automation and for use in the automobile industry, with the possibility of effective development of new applications.

SUMMARY OF THE INVENTION

The invention as filed involves the arrangement of a module (e.g., device) for wireless communication between electric or electronic equipment or systems, in high frequency bands in the range of 300 MHz to 2.60 GHz, particularly for home and office automation systems. The module includes a block for wireless communication. The block for wireless communication is connected to an antenna interface, to a power supply interface, and to a control block. The basis of the invention lies in the fact that the module further contains a control unit which includes a central processor unit, a memory for storing the operational system control code to ensure the function of wireless communication, and a memory for storing or starting up a user-defined applicational control code. The control unit is connected to the control block, to the communication interface of the module, and to the power supply interface. The memory storing the operational system control code, and the memory for storing or starting up the user-defined applicational control code can be integrated into the memory block of the control unit. The invention also involves a topology of the module so that the module can be used for building a generic communication platform that is inexpensive, simple to produce (modular execution) and that can facilitate the very fast development of new applications. The section of the memory storing the operational system control code to ensure the function of wireless communication, and the memory for storing or starting up a user-defined applicational control code, together with the operational system control code, offers the economically advantageous possibility of independent development of an operational system and applicational code.

If the memory with the operational system control code and the memory for storing and starting up a user-defined applicational control code are integrated into the memory block of the control unit, it is even more simple and inexpensive, since the section of both these memories can be realized by virtual program means in a single memory block.

In an alternative embodiment, the module also contains a control unit which includes a central processor unit and a memory block for the operational system control code to ensure the function of wireless communication and for saving or starting up a user-defined applicational control code, where the control unit is connected to the control block, to the communication interface of the module and to the power supply interface. An advantage is the easy adaptation of the specific user implementation, with the possibility of custom-made adjustments and improvement, as well as saving of the memory. It is possible to use a less expensive micro-controller with smaller memory capacity, implemented directly onto the chip.

The control block can be an integral part of the block for wireless communication, or an integral part of the control unit. The integration of several functions into the block for wireless communication or into specialized circuits created in a single casing brings further simplification of control and a reduction of costs.

The control block can be connected to the power supply interface. Because the control block can bring about the adjustment of the transmitter output, it is advantageous to connect it to the power supply interface. The advantage of this connection is the possibility of implementation of other more advanced functions; for example, a control circuit can also be used as an IN/OUT buffer.

In an alternative embodiment, the module can include a voltage source, in which case the power supply interface is an internal interface between that voltage source and the operating blocks of the module. The module can further incorporate an antenna, while the antenna interface is an internal interface between the antenna and the operating blocks of the module. The advantage is that the module can be used in mobile applications, if there is a failure in the external voltage source.

The control unit can include peripherals selected from the group consisting of analog-to-digital (A/D) or digital-to-analog (D/A) converters, peripherals for pulse width modulation, other serial communication interfaces, or separate inputs and outputs for connecting other devices to the module.

By adding other peripherals, the possibilities for use of the module are significantly increased, in some cases with a sufficient number of peripherals, the module can also be used as an independent application.

The subject of this invention is also a method for controlling the module, based on the fact that, in the memory with operational system control code or in the memory block, a control code for the module's operating modes of transmission and reception is implemented, initiated from the applicational control code, to start up these modes. The operational system control code in the memory or memory block includes a function for switching the module to the programming mode, with the possibility of changing the existing control code or inserting another control code, and/or a function for inserting or changing the control data. The invention also involves a method of control that can be used for constructing a generic communication platform. The section with the operational system control code and applicational code provides the possibility of independent development of an operational system and applicational code. A generic communication platform further reduces the cost of using the hardware, a universal programmer is not necessary, for example, for the upload of the applicational control code, since the combination of a simple communication interface and software is sufficient.

The transmission and/or reception parameters of the block for wireless communication can, at the same time, be controlled by the control block of the module. The transfer of the specialized function of the control block for wireless communication to the control block brings simplification of the control code in the control unit and the possibility of using the memory designed for this code for another code or using a micro-controller with smaller memory capacity.

A further subject of this invention is a method of creating a generic platform for user applications in the area of wireless communication, with the above-mentioned module, where a control code for the operational programming mode is added to the module memory with operational system control code or memory block of the module, the input and output terminals I/O of the control unit are operationally dedicated and the addresses and method of selecting the individual services of the operational system are published, while the communication interface of the module is used for recording an applicational control code in the memory for storing or starting up a user-defined applicational control code. This generic platform, where the applicational control code, recorded into the memory for storing or starting up an user-defined applicational control code by means of the communicational interface or without wires, using the services of the operational system control code stored in the memory with the operational system control code makes it possible to effectively create a new application and represents an important simplification in the development of new applications.

BRIEF DESCRIPTION OF THE DRAWINGS

A more detailed explanation of the invention is provided in the examples of embodiments shown in the attached drawings and in the description that follows.

DETAILED DESCRIPTION OF EXEMPLARY EMBODIMENTS

Figure 1:
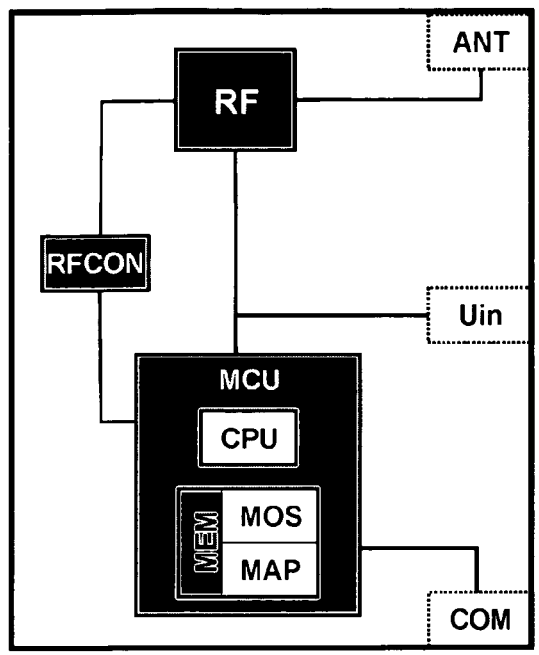
FIG. 1 shows the block connection of the module for wireless communication.
Figure 2:
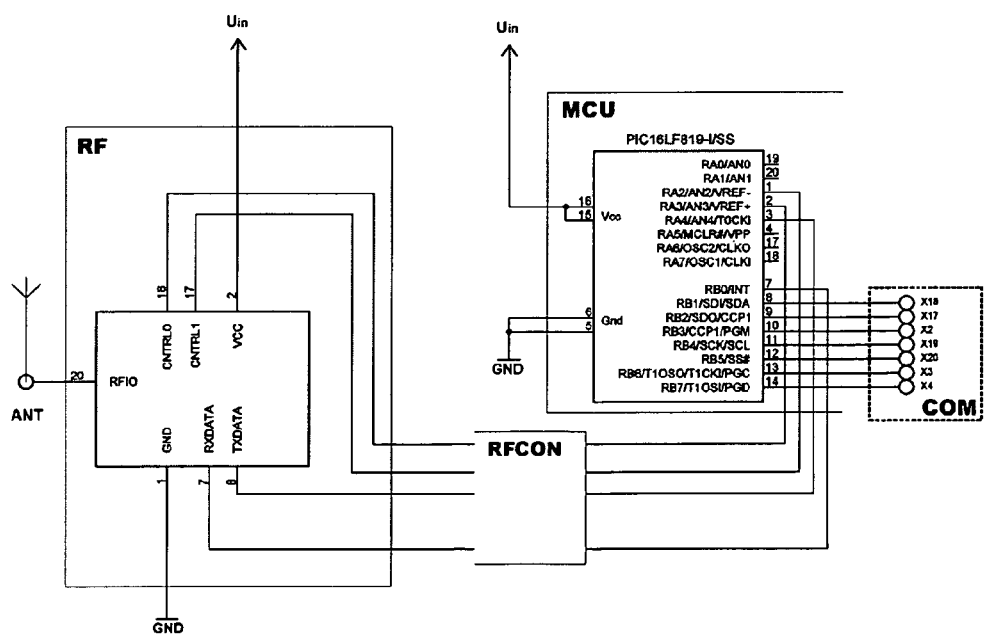
FIG. 2 shows an example of a specific connection of this module.

FIG. 1 shows a block diagram of the connection of the module for wireless communication between electrically or electronically controlled equipment or systems, in high frequency bands in the range of 300 MHz to 2.60 GHz, particularly for home and office automation systems, including for example heating systems, security systems, lighting, measuring systems, data collection systems etc. FIG. 2 shows one of the possible, specific connections this module. The module comprises a block RF for wireless communication, connected to the antenna interface ANT and the power supply interface Uin and also to the control block RFCON. The module further contains a control unit MCU comprising a central processor unit CPU, a memory MOS with the operational system control code to ensure the function of wireless communication and a memory MAP for storing or starting up a user-defined applicational control code. The control unit MCU is connected to the control block RFCON, to the communication interface COM of the module and to the power supply interface Uin. The memory MOS with the operational system control code and the memory MAP for storing or starting up a user-defined applicational control code can be integrated into the memory block MEM of the control unit MCU. Alternatively, the operational system control code to ensure the function of wireless communication and the applicational control code can be stored in a single memory block MEM, which is not further divided into a memory MOS with the operational system control code to ensure the function of wireless communication and a memory MAP for storing or starting up a user-defined applicational control code. The control block RFCON can be an integral part of the block RF for wireless communication, or an integral part of the control unit MCU. The control block RFCON can also be connected to the power supply interface (Uin).

The block RF ensures the basic function for wireless communication, that is reception and transmission by a wireless communication channel. During transmission, the block RF modulates the data at the input from the control block RFCON into a high frequency signal, and during reception, the block RF converts the high frequency signal into data which it subsequently sends to the control block RFCON. The block RF for wireless communication can consist of a suitable transceiver, radio integrated RFIC circuits or a combination transmitter and receiver (for example the transceivers of the firm RFM, based on SAW technology, the RFIC circuits of the firm Chipcon or any solution available on the market which permits wireless reception and transmission in the required frequency band). The control block RFCON is a block or interface, by means of which the control unit MCU can control the block RF for wireless communication and by means of which the control unit MCU communicates with this block. In the basic embodiment, where the circuit of the transceiver works quite autonomously in the completely dual mode, the control block RFCON can serve only as a data interface between the control unit MCU and the block RF for wireless communication and can be realized with the corresponding inputs and outputs of the control unit MCU and of the block RF and can be integrated directly into these blocks. The control block RFCON can however also permit the configuration of the block RF for reception and transmission, or, according to the specific application of the solution, the control block RFCON can serve for switching the block RF to the reduced consumption (Sleep) mode or for setting the transmission output or other parameters of the block RF for wireless communication. In the simplest case the control block RFCON can consist of a connection between the entry and output block RF and the control unit MCU or as a resistor field. If the block RF for wireless communication makes it possible to set the transmission output of the module so that the current into the relevant entry is commensurate (see for example the transceiver circuits of the firm RFM), part of the control block RFCON can be realized for regulating the transmission output as a resistive net, so that all the resistors are connected to the block RF for wireless communication at one common end and the other ends have connections to the various outputs of the control unit MCU, which thus selects the transmission output by simply making contact with the appropriate output.

Some circuits of the RF transceivers also make it possible to set other RF parameters of the block RF for wireless communication (reception sensitivity, working frequency, transmission output) through a communication interface (for example serial) of the block RF for wireless communication itself, so that any defined sequence of the data is registered through it. In this case the control block RFCON must ensure adjustment to the interface of the block RF for wireless communication. If the interface of this block is for example some serial interface, implementation of the control block RFCON into the control unit MCU can be used and the appropriate periphery of the control unit MCU for serial communication can be used.

It can also be advantageous to store output or input data in the stack. Thereby the load on the control unit MCU is reduced (it is not necessary to wait). In this case the control block RFCON can contain further memory for realizing this stack. The control block RFCON should at least contain an output block RF for wireless communication for received data (input of the control unit MCU) and an input for data transmitted from the control unit MCU.

The control unit MCU carries out the control of the whole module on the basis of the user-defined applicational control code stored in the applicational part of the memory MAP for storing or starting up a user-defined applicational control code and using the services of the operational system stored in part of the memory MOS with the operational system control code. During the actual realization of the control unit MCU, the parts MOS and MAP of the memory can be physically separated or can be realized in one memory block. Because it is generally desirable to protect the publication of the control code stored in the memory MOS and on the other hand to make it possible for users to enter the control code into the applicational part of the memory MAP, it is advantageous to ensure, at least on the level of the hardware or software, the separation of the access to this second memory. For the actual implementation of the control unit MCU it is possible to use, for example, a gate field, a processor or a micro-controller.

The control unit MCU can contain further peripheries suitable for carrying out other activities, as for example an A/D converter, other serial communicational interfaces (SPI, UART, ICSP etc.) or separate inputs and outputs, by means of which it is possible to connect further devices to the module. The memory MAP can also be realized as a separate memory (apart from the control unit MCU).

An antenna interface ANT can consist of a transmitting and receiving antenna or an input for connecting an external antenna, where the antenna is not directly integrated into the module. The power supply interface Uin consists of inputs for the connection of external power (+, −). Depending upon the specific embodiment, it can also be a battery or a power supply source integrated directly into the module. The communication interface COM of the module consists in most cases of some modification of the serial port of the control unit MCU. It is possible to use, for example, the peripheries of the micro-controller, supporting various buses and protocols—UART, SPI, 12C, CAN, LIN, ICSP or other combinations. The communicational interface COM can also be implemented by the program (without specialized peripheries of the control unit MCU) by using the standard I/O terminals of the processor.

Depending upon the specific realization and on the control code, the module can work in the basic operational modes of "transmitting" or "receiving", and also in other modes, as for example "programming" or "sleep". In the "receiving" mode a high frequency signal is brought from the antenna interface ANT to the block RF for wireless communication, in which it is demodulated and converted into data, for the most part binary, thus a sequence of ones and zeros, which are subsequently transferred through the control block RFCON to the control unit MCU where they are processed on the basis of the control code stored in the memory MOS with the operational system control code, so that they can be further used by the functions of the control code stored in that memory MOS or in the memory MAP for storing or starting up a user-defined applicational control code.

In the "transmitting" mode, the control unit MCU sends data through the control block RFCON to the block RF for wireless communication, where they are then modulated (OOK, ASK or FSK) at a high frequency signal (at the working frequency of the module) and emitted through the antenna interface ANT into the surrounding area. Depending upon the specific realization and upon the hardware equipment of the module, the operational modes "transmitting" and "receiving" can proceed simultaneously, meaning that the reception of data from the block RF for wireless communication can also proceed into the control unit MCU and from the control unit MCU to the block RF for wireless communication so that the high frequency signal is brought from/into the antenna interface ANT.

The module is switched by the control code into the "sleep" mode if there is a need to reduce the consumption of the module in connection with the specific application to be realized by means of the module, for example in the case of the use of the module for mobile, mainly battery driven equipment for measuring similar quantities in certain time intervals. During those time intervals, measurement of the quantity is carried out, the data is then transmitted and the reduced consumption mode is resumed. Switching to the reduced consumption mode by means of the module thus ensures a significantly longer lifetime for the battery of the equipment. In the "programming" mode it is possible to record an applicational control code or data in the memory MAP for storing or starting up a user-defined applicational control code.

The basis of the described method of controlling the module is the implementation of the control code for the operating modes "transmitting" and "receiving in the memory MOS with the operational system control code, from which the applicational control code can be selected. The control unit MCU ensures control of the module by means of control codes stored in the memory MOS, or in the memory MAP. Because the creation of a quality control code for receiving and transmitting is based on long term work, trials and verifications, it can be said that the implementation alone of a control code for receiving and transmitting data by a wireless RF channel and the possibility of its use simply by selecting this code brings a significant saving in time and therefore also in the expenses necessary for the development of new applications.

The aim of this invention was to create a platform by means of which it will be possible to efficiently generate other applications. For this reason the standard program memory of the control unit MCU was virtually divided into two parts by means of the programming tools and hardware equipment of the control unit MCU—into the memory MOS containing the operational system control code and the memory MAP for the control code for user application. This at least virtual division of the memory makes possible the independent development of an operational system control code and a control code for user application, which uses the implemented services of the operational system, which is suitable among other things for ensuring the consistency of the control code stored in the MOS. The separation allows also the possibility of concealing or locking up especially the control code stored in the memory MOS with the operational system control code and in the memory MAP for storing or starting up a user-defined applicational control code, which can be advantageous for example for implementing a security function, coding and decoding into a control code stored in the memory MOS.

By the addition of a control code for the "programming" mode into the memory MOS with the operational system control code, by the functional dedication of the I/O terminals of the control unit MCU and the publication of addresses and means for selecting individual services of the operational system, a generic platform is created for development of user applications for the area of wireless communication using the communication interface COM for recording the applicational control code into the memory MAP.

To add the possibility of high frequency wireless communication for existing electronic equipment comprises creating communication hardware and corresponding programming equipment. The hardware carries out its own conversion of data into a high frequency signal and back again into data, the communication program equipment ensures the processing of the sequence of the data, the elimination of defects resulting from interference in the transmission channel or during processing and also provides basic control of the peripheries of the module. To create such hardware and relevant programming equipment as will be optimal for high frequency radio communication is very expensive in time and money.

By using the module according to this invention and the operational system control code stored in its memory MOS with the operational system control code, it is possible to very quickly and economically create applications for wireless communication. The reason is the repeated use of communication routines for the operating modes "transmitting" and "receiving", which are stored in the memory MOS and which it is therefore not necessary to program or optimize.

If other routines are added to the control code stored in the memory MOS, for example to configure or initialize the hardware or peripheries of the module, routines for handling inputs and outputs or other routines for scheduling various tasks, a further significant reduction occurs in the time required to develop an application. It is not necessary for the user to program these functions, but simply to call upon them as a service of the operational system stored in the memory MOS.

By adding a "programming" control code, that is for saving an applicational control code in the memory MAP (the memory for saving or starting up a user-defined applicational control code), the module can be switched into the "programming" operational mode. By this means it is possible to use any standard communication module interface (or wireless communication) to insert an application control code. It is no longer necessary to purchase specialized programming hardware.

Figure 3:
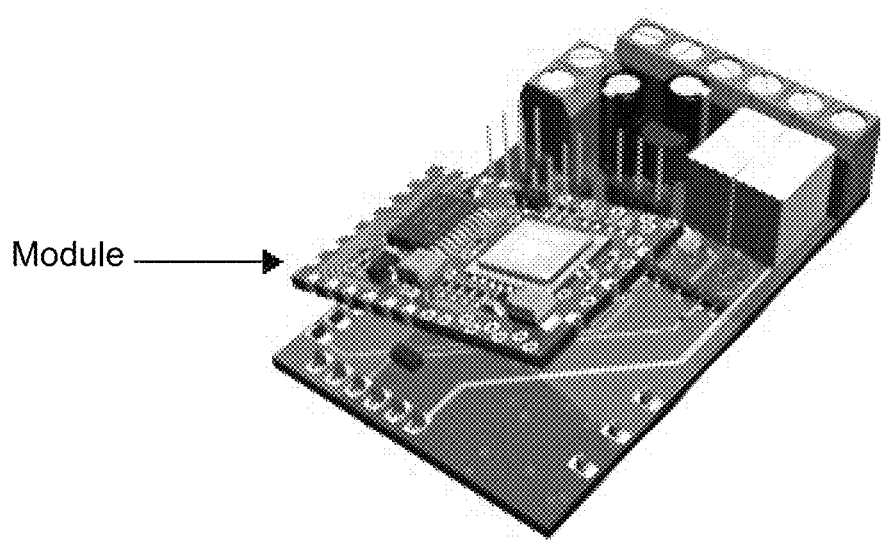
In FIG. 3, there is a photograph of the module which, by connecting to the basic board with the required interfaces and other components, such as a voltage and relay stabilizer, for example, a kit can be created for use in the development of other equipment and applications for high frequency wireless communication.
Figure 4:
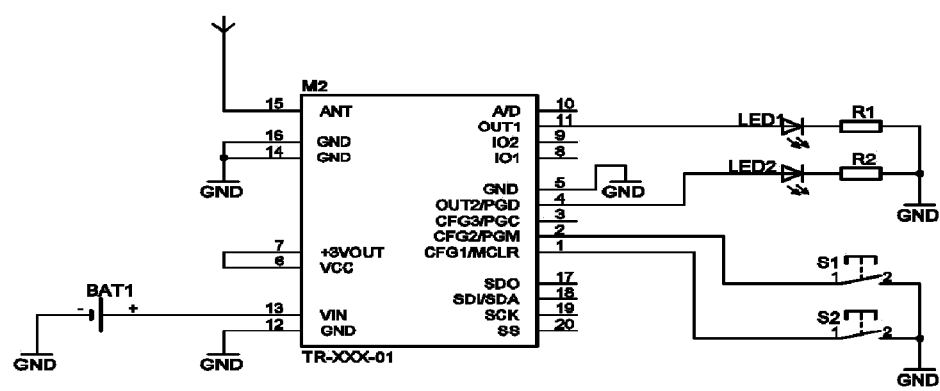
FIG. 4 shows an example of the use of the module for the construction of a remote control element.

By attaching the module described above to a baseplate containing the required interface and further components as the case may be, for example a voltage stabilizer and relay, a development kit can be created which can be effectively used in the development of other equipment and applications for high frequency wireless communication. FIG. 3 illustrates the creation of a development kit by attaching a module (illustrated with arrow) to such a baseplate. FIG. 4 illustrates the use of the module according to this invention for the construction of a remote controller.

This invention is intended particularly for use in home and office automation systems, including the control of heating systems. Use of the module for wireless communication within the framework of a heating system eliminates the need to install data cabling, and construction work is also unnecessary. A modular heating system composed of electric, direct-heat radiators and heat sensors provides a clear example of the advantageous use of the modules for the control of heating systems. In the basic version, the controlling electronics of each radiator provide only simple control of the radiator in relation to the temperature set. The temperature is read from a heat sensor located in the radiator and the radiator is regulated according to that temperature. Such a basic radiator design is inexpensive, but its disadvantage lies in the low degree of comfort afforded, due both to a distortion of the regulated temperature because it is regulated according to the temperature around the radiator, and to the absence of a function for increasing user comfort. For example, it is not possible to program the temperature in relation to the time (e.g. an economy regime during periods of absence on weekdays), or to switch on or off or change the regulated temperature settings from a central point, for all of the radiators.

If, however, the basic electronics contain an interface for the connection of a communication module, the radiator can be extended anytime by the insertion of a module for other functions, including a central control function. By connecting a module and adding the possibility of wireless communication, it is possible to get temperature readings from the "comfort zone", that is from the area where the user will be, and to regulate the temperature accordingly. By using the appropriate programming and hardware equipment from the computer, the user can insert, by wireless means, a control code or data into the applicational part of the memory MAP for saving or starting up a user-defined applicational control code, and through the communication interface COM of the module, he can work with the basic electronics. It is thus possible, for example, to set a time-related temperature regime from the computer, or to synchronize the time with any other node connected to the wireless communication network so created. The need to generate a clock of real time in the equipment is thereby eliminated, leading to a reduction in costs. By working with a computer, the subsequent setting or control of the system is easier and more efficient.

Another possible use of the module according to this invention is as a basic structural element in extended systems for wireless collection of data on water, electricity or gas consumption, for example. Just as in the control of heating systems described above, the equipment for measuring consumption consists of basic electronics and an interface for connecting a module. The basic electronics simply carry out the actual measurement and storage of the consumption data. They are therefore inexpensive. Providing the electronics board with interface for subsequent connection of a module is inexpensive and allows for further gradual expansion of the system.

By connecting the module, with the related control code located in the memory MOS with operational system control code for ensuring the wireless communication function, to the equipment carrying out the measurement of consumption, the possibility of long-distance, wireless reading of consumption is added to this equipment, which is economically attractive. At the same time this interface can be used, for example, for wireless transfer of useful information to the parent unit. Such information can involve, for example, the condition of the battery in the equipment carrying out the measurement of consumption, thereby preventing failure or malfunction of the equipment. The user memory MAP for saving or starting up a user-defined applicational control code can be used for saving a user's code, for example the identification number of the meter, or for checking the data, to increase the security of the measured data.

The module according to this invention can be used as a wireless communication interface for electric or electronic equipment, but also as an independent application. For maximum universality of use and to cover the greatest number of applications, it is possible to add further interfaces to the module, for example A/D converters, inputs, outputs etc. By preserving the compatibility of the module outputs and the internal modular architecture of the various modules, it is possible, by a simple exchange of the block RF for wireless communication, to achieve significant universality of use of the modules. Because the individual modules in a given series have full architectural compatibility and differ only in the block RF for wireless communication, which transmits and receives on other frequencies, it is possible to use an already created applicational control code without the need for any adaptations for another module in a given series. This can be used, for example, by firms on exporting their products to various countries where different rules apply for use of frequency bands. They simply place in their equipment a communication module with a working frequency permitted in an exporting country and it is not necessary to change the connection of the equipment or the applicational control code. By inserting an applicational control code into the memory MAP for saving or starting up a user-defined applicational control code, it is possible to create a great number of varied applications by means of these modular concepts.

Figure 5:
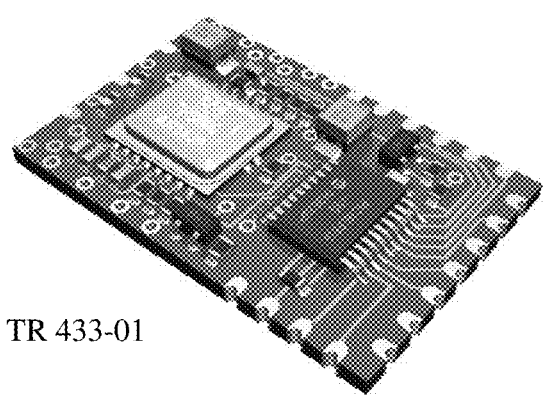
In FIG. 5, there is a photograph of three modules in a type series, which differ only in the working frequency (433.92 MHz, 868.35 MHz and 916.5 MHz).
Figure 5:
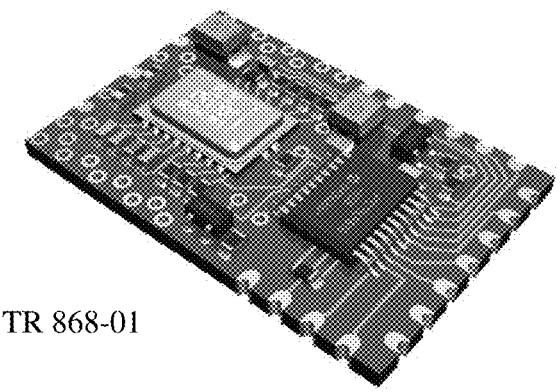
Figure 5:
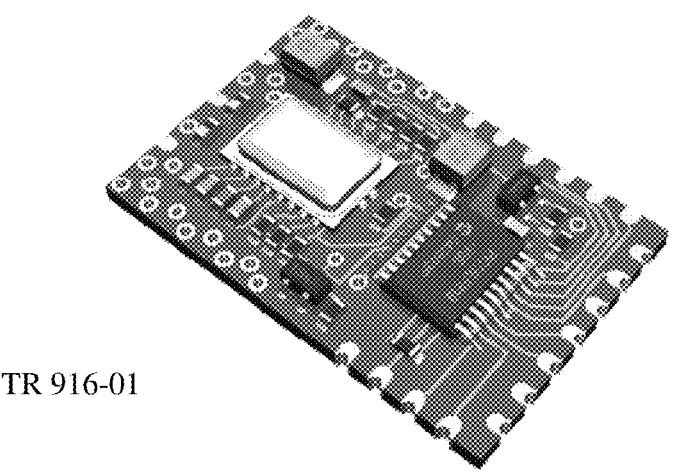

FIG. 5 illustrates three examples of modules in a type series, which differ only in the working frequency, such as 433.92 MHz (denoted by reference number TR 433-01), 868.35 MHz (denoted by reference number TR 868-01) and 916.5 MHz (denoted by reference number TR 916-01).

INDUSTRIAL USE

The invention can be used to streamline the development of wireless applications, to ensure wireless connectivity of electric and electronic equipment and other equipment connected to it, such as heating system elements, security systems or lights. The modules are further designed for use as nodes in MESH networks where, by the simple addition of other elements such as sensors, they can also be used as independent applications, for example as sensors which transmit measured analogue or digital quantities for further processing by a wireless communication channel. Use of the invention is primarily in applications for home and office automation, in measuring systems, in data collection systems and everywhere where the use of cables or other direct connection for the transfer of data is inefficient and where, for reasons of cost and complexity, it is not possible to use ZIGBEE®, WIFI® or BLUETOOTH® technology.

The invention claimed is:

1. A device for wireless communication between electric or electronic equipment or systems, in high frequency bands in the range of 300 MHz to 2.60 GHz, the device comprising:
   an antenna interface;
   a power supply interface;
   a control block;
   an RF block for wireless communication connected to the antenna interface, to the power supply interface, and to the control block;
   a communication interface; and
   a control unit connected to the control block, to the communication interface, and to the power supply interface,
   wherein the control unit includes
      a central processor unit,
      a first memory unit for storing an operational system control code of the device, the operational system control code constituting a generic platform for the device, and
      a second memory unit for storing and starting up a user-defined applicational control code of the device for activation of a user-defined executable application in the device within the generic platform of the operational system control code; and
   wherein the first memory unit is separated from the second memory unit such that the operational system control code of the device stored in the first memory unit is separated from the user-defined applicational control code of the device that is stored and started in the second memory unit.

2. A device according to claim 1, wherein:
   the control unit comprises a memory device; and
   the first memory unit storing the operational system control code and the second memory unit at least one of storing and starting up the user-defined applicational control code are integrated in the memory device of the control unit and are virtually separated from each other in the memory device of the control unit.

3. A device according to claim 1, wherein:
   the control unit comprises a memory device; and
   the first memory unit storing the operational system control code and the second memory unit at least one of storing and starting up the user-defined applicational control code are integrated in the memory device of the control unit.

4. A device according to claim 1, wherein the control block is an integral part of the RF block for wireless communication.

5. A device according to claim 1, wherein the control block is an integral part of the control unit.

6. A device according to claim 1, wherein the control block is connected to the power supply interface.

7. A device according to claim 1, further comprising a voltage source, wherein the power supply interface is an internal interface between the voltage source and operating blocks of the device.

8. A device according to claim 1, further comprising an antenna,
wherein the antenna interface is an internal interface between the antenna and operating blocks of the device.

9. A device according to claim 1, wherein the control unit includes peripherals selected from the group consisting of analog-to-digital or digital-to-analog converters, peripherals for pulse width modulation, serial communication interfaces, and inputs and outputs for connecting other devices to the device.

10. A device according to claim 1, wherein the first memory unit is configured to store a control code for implementing operating modes of the device for transmission and reception, the control code for implementing the operating modes being configured to be initiated from execution of the applicational control code stored in the second memory unit.

11. A device according to claim 1, wherein:
the control unit comprises a memory device;
the first memory unit storing the operational system control code and the second memory unit at least one of storing and starting up the user-defined applicational control code are integrated in the memory device of the control unit; and
one of the first memory unit and the memory device of the control unit is configured to store a control code for implementing operating modes of the device for transmission and reception, the control code for implementing the operating modes being configured to be initiated from execution of the applicational control code stored in the second memory unit.

12. A device according to claim 1, wherein the operational system control code stored in the first memory unit is configured to enable switching of the device to a programming device to facilitate at least one of modification of the control code, insertion of additional control code, insertion of another control code, and manipulation of control data among the control code.

13. A device according to claim 1, wherein the control block is configured to control at least one of transmission and reception parameters of the RF block for wireless communication.

14. A device according to claim 1, wherein the device comprises an interface for connection to electric or electronic equipment, to enable the equipment to communicate wirelessly via the device connected thereto.

15. A device according to claim 1, wherein the device is configured for at least one of home and office automation systems.

16. A method of creating a generic platform for user applications in an area of wireless communication in a device, wherein the device comprises:
an antenna interface;
a power supply interface;
a control block;
an RF block for wireless communication connected to the antenna interface, to the power supply interface, and to the control block;
a communication interface; and
a control unit connected to the control block, to the communication interface, and to the power supply interface, the control unit including a central processor unit, input and output terminals, a first memory unit, and a second memory unit, which is separated from the first memory unit;
wherein the method comprises:
storing a control code for an operational programming mode of the device to the first memory unit of the device, the control code constituting a generic platform for the device;
dedicating the input and output terminals of the control unit to respective operations to be performed;
defining selectable services to be performed in the device;
storing a user-defined applicational control code in the second memory unit via the communication interface for activation of a user-defined executable application; and
activating the user-defined applicational control code stored in the second memory unit to activate the user-defined application in the device within the generic platform of the control code for the operational programming mode of the device stored in the first memory unit,
wherein the first memory unit is separated from the second memory unit such that the control code for the operational programming mode of the device stored in the first memory unit is separated from the user-defined applicational control code stored and activated in the second memory unit.

17. A device according to claim 1, wherein the first memory unit is separated from the second memory unit such that the operational system control code of the device stored in the first memory unit is unaffected by modifications to the user-defined applicational control code of the device that is at least one of stored and started in the second memory unit.

18. A method according to claim 16, wherein the first memory unit is separated from the second memory unit such that the operational system control code of the device stored in the first memory unit is unaffected by modifications to the user-defined applicational control code of the device that is at least one of stored and started in the second memory unit.

* * * * *